United States Patent
Catovic et al.

(10) Patent No.: US 9,839,005 B2
(45) Date of Patent: *Dec. 5, 2017

(54) METHODS AND APPARATUS FOR MOBILE TERMINAL-BASED RADIO RESOURCE MANAGEMENT AND WIRELESS NETWORK OPTIMIZATION

(75) Inventors: Amer Catovic, San Diego, CA (US); Peter H. Rauber, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1466 days.

This patent is subject to a terminal disclaimer.

(21) Appl. No.: 11/498,461

(22) Filed: Aug. 2, 2006

(65) Prior Publication Data

US 2008/0032677 A1  Feb. 7, 2008

(51) Int. Cl.
*H04W 72/02* (2009.01)
*H04W 36/36* (2009.01)

(52) U.S. Cl.
CPC .......... *H04W 72/02* (2013.01); *H04W 36/36* (2013.01)

(58) Field of Classification Search
CPC ... H04W 4/028; H04W 28/26; H04W 72/085; H04W 4/00; H04W 4/02; H04W 4/021; H04W 64/006; H04W 8/245
(Continued)

(56) References Cited

U.S. PATENT DOCUMENTS 6,321,090 B1  11/2001  Soliman
6,556,834 B1 *  4/2003  Kobayashi et al. .......... 455/464
(Continued)

FOREIGN PATENT DOCUMENTS

EP  1641297  3/2006
TW  I236303  7/2005
(Continued)

OTHER PUBLICATIONS

International Search Report—PCT/US2007/074768, International Searching Authority—European Patent Office—dated Feb. 6, 2008.
(Continued)

*Primary Examiner* — Nizar Sivji
(74) *Attorney, Agent, or Firm* — Patterson & Sheridan, LLP

(57) ABSTRACT

Methods, devices, processors and computer program products for mobile terminal-based Radio Resource Management (RRM) and network optimization. The mobile terminal measures or otherwise obtains radio condition measurements (such as received power, interference, mobile transmit power and the like) and/or geographical location measurements. The radio condition measurements and/or location measurements are compared against historical data and/or target Key Performance Indicators (KPI) and, based on the comparison, a determination can be made as to whether adjustment of RRM parameters is warranted. By providing for RRM management at the mobile terminal level, as opposed to a cell or Radio Network Controller (RNC) level, better granularity of management is realized in the overall radio network. Further, individual mobile terminals can better tailor their radio resource needs to meet their conditions of use and, as such, better overall service can be realized by the individual mobile terminals in the network.

48 Claims, 11 Drawing Sheets

(58) Field of Classification Search
USPC ..... 455/436, 437, 439, 442, 414.1; 370/331, 370/332
See application file for complete search history.

(56) References Cited

U.S. PATENT DOCUMENTS

| | | | |
|---|---|---|---|
| 6,965,585 B2* | 11/2005 | Grilli et al. | 370/331 |
| 7,047,003 B2* | 5/2006 | Sako et al. | 455/423 |
| 7,310,528 B2 | 12/2007 | Natsume | |
| 7,373,148 B2 | 5/2008 | Kim et al. | |
| 7,634,272 B2 | 12/2009 | Yamashita et al. | |
| 2002/0128035 A1 | 9/2002 | Jokinen et al. | |
| 2004/0143428 A1 | 7/2004 | Rappaport et al. | |
| 2004/0157608 A1 | 8/2004 | Kurose et al. | |
| 2004/0248568 A1* | 12/2004 | Lucidarme | 455/423 |
| 2005/0250529 A1 | 11/2005 | Funnell et al. | |
| 2006/0009253 A1 | 1/2006 | Nielsen et al. | |
| 2006/0094452 A1 | 5/2006 | Kang | |
| 2006/0227744 A1* | 10/2006 | Metke et al. | 370/331 |
| 2006/0258386 A1 | 11/2006 | Jeong et al. | |
| 2007/0004445 A1 | 1/2007 | Dorsey et al. | |
| 2007/0049311 A1 | 3/2007 | Lindoff et al. | |
| 2007/0064648 A1* | 3/2007 | Kim et al. | 370/331 |
| 2007/0123258 A1 | 5/2007 | Sawyer | |
| 2010/0136969 A1 | 6/2010 | Nader et al. | |
| 2010/0173653 A1 | 7/2010 | Catovic et al. | |

FOREIGN PATENT DOCUMENTS

| | | |
|---|---|---|
| TW | I243620 | 11/2005 |
| WO | 0067512 | 11/2000 |

OTHER PUBLICATIONS

Written Opinion—PCT/US2007/074768, International Searching Authority—European Patent Office—dated Feb. 6, 2008.
Taiwan Search Report—TW096128460—TIPO—dated Jun. 3, 2011.

* cited by examiner

METHODS AND APPARATUS FOR MOBILE TERMINAL-BASED RADIO RESOURCE MANAGEMENT AND WIRELESS NETWORK OPTIMIZATION

BACKGROUND

The described embodiments related to management of wireless networks, and more particularly, to apparatus and methods for mobile terminal-based radio resource management and wireless network optimization.

Currently, wireless systems, such as Universal Mobile Telecommunications System (UMTS) and Code Division Multiple Access (CDMA) systems, rely on network-based Radio Resource Management (RRM). At the network side, a Radio Network Controller (RNC) or some similar network device, is responsible for radio resource policy making and enforcement. In this regard, the RNC configures all of the radio resource parameters, the radio resource measurements and makes the handover decisions for all of the connected mode mobile terminals in the network. When the mobile terminal is in idle mode (no active connection), the mobile terminal can make handover decisions independently from the RNC. Handover in idle mode is called "cell reselection" and although the handover decisions are performed independently by the mobile terminal, the parameters setting the criteria for cell reselection are set by the RNC.

Recent developments in the network infrastructure design have provided for RRM granularity at the cell level. Thus, a RNC is capable of providing uniform configuration to all of the mobile terminals within an area served by a given cell. For example, a given RNC is able to configure and manage the hard and soft handover process uniformly across all the mobile terminals currently located in a given cellular area serviced by the RNC. In other words, all of the mobile terminals within the area served by a given cell will have the same handover criteria and the same handover thresholds, collectively referred to as RRM parameters. Conversely, the RRM parameter configuration may be configured such that the parameters vary from one cell to another.

Uniform configuration across the entire cell does not take into account the heterogeneous nature of the mobile terminals that may reside in any one area served by a cell. For example, a cell may serve an area anywhere from 10 km$^2$ to 30 km$^2$ and, therefore, the mobile terminals that reside in the area served by the cell may widely differ in terms of mobility patterns and may further experience widely varying radio environments. For example, the cellular area may include mobile terminals that are in transit, such as mobile terminals in use by high-speed highway travelers or conventional municipal travelers, and mobile terminals that are used by pedestrians or stationary users located either outdoors or indoors. All of these mobile terminals will vary in terms of radio frequency conditions and, as such, will have variances in terms of radio resource requirements. Current RRM techniques, which, as noted, are limited to configuration and optimization of the mobile terminals at the cellular level, do not provide for management of resources and parameters on a mobile terminal-by-mobile terminal basis to optimize the experience of a given mobile terminal.

For example, in a hypothetical inter-Radio Access Technology (inter-RAT) handover scenario, where a call is transferred from one system to another, the RRM of the cell may be configured such that the handover decision process from the UMTS to the Global System for Mobile (GSM) telecommunications occurs if the Received Signal Code Power (RSCP) falls below a specified cell-wide threshold. The cell-wide threshold may be justifiable, for example, for mobile terminals in transit, however, the threshold may trigger handover to the GSM in instances in which the radio signal is sufficiently adequate for a stationary mobile terminal, such as a workplace user. In effect, all of the mobile terminals in the cellular area are provided uniform RRM and the variance in mobile terminal radio conditions are not taken into account in the radio resource management process. This results in less than ideal network performance and does not account for the unique radio characteristics experienced by each mobile terminal in the network.

Therefore, a need exists to develop methods and devices that provide for RRM at the mobile terminal level. By providing for RRM at the mobile terminal level, network optimization may be increased such that mobile terminals with widely varying radio conditions can be accounted for and adjustments made at the mobile terminal level to optimize the performance of each individual mobile terminal.

SUMMARY

Thus, present aspects define methods, devices, systems and computer program products for mobile terminal-based Radio Resource Management (RRM) and network optimization. The mobile terminal measures or otherwise obtains radio condition measurements, such as received power, interference, mobile transmit power and the like. The radio condition measurements are compared against historical data, such as historical condition data, historical performance indicator data or the like. Based on the comparison a determination can be made as to whether adjustment of RRM parameters is warranted. The RRM parameters may include, but are not limited to, hard network handover parameters, soft cell handover parameters, serving cell change parameters, rate switching parameters and the like. Adjustment of the parameters will typically occur at the entity (mobile terminal or network device) that uses the parameters in the RRM process. Thus, adjustment may occur at the mobile terminal or a network device may be prompted to adjust the mobile terminal parameters. In addition, the radio condition measurements may be correlated with other data, such as geographic location at which the data occurred, a time parameter associated with the occurrence of the data or the like. The geographic location and/or the time parameter may be used individually, or in some combination, to make adjustment decisions. Further, the geographic location and/or the time parameter may be correlated with and compared to historical data that includes corresponding historical geographical location and/or time data to provide a basis for making an adjustment. By providing for RRM management at the mobile terminal level, as opposed to the network level, better granularity of management is realized in the overall radio network. Individual mobile terminals can better tailor their radio resource needs to meet their conditions of use and, as such better overall service can be realized by the individual mobile terminals in the network.

In one aspect, a method for mobile terminal-based radio resource management is provided. The method includes obtaining, at a mobile terminal, at least one radio condition measurement, such as received power, interference, mobile transmit power or the like. Once the radio condition measurements are obtained they are compared to historical radio condition data to determine if Radio Resource Management (RRM) parameters warrant adjustment. The RRM parameters may include, but are not limited to hard network handover parameters, soft cell handover parameters, serving cell change parameters, rate switching parameters and the like. If the comparison determines that that an adjustment is warranted, the mobile terminal initiates an adjustment to one or more Radio Resource Management (RRM) parameters.

In one aspect, comparing the radio condition measurements to historical radio condition data may involve comparing the radio condition measurements to historical radio condition data having associated historical performance indicator data, such as a call drop data, call set-up success rate data, average data rate data, end-to-end delay data and the like. In such an aspect, initiation of the RRM parameter adjustment may occur based on a predetermined difference between the associated historical performance indicator data and at least one corresponding predetermined performance indicator standard, such as a call drop standard, a call set-up standard, an average data rate standard, an end-to-end delay standard or the like. In another aspect, initiation of the RRM parameter adjustment may occur based on the comparison determining that the at least one, typically two or more, radio resource management parameters are within a historical radio condition adjustment range.

In some aspects the radio condition measurements may be correlated with other adjustment-relevant data, such as geographical location data, time parameter data and the like. The adjustment-relevant data may be used on its own, or in some aspects it may be correlated and compared to historical data that includes corresponding historical adjustment-relevant data in order to determine whether to make an adjustment. The other adjustment-relevant data provides for the adjustment method to take into account such factors as the geographic location of the mobile terminal or the duration or time of day of the service degradation or outage in determining whether adjustment to the RRM parameters is warranted.

Another aspect is defined by a computer readable medium including instructions stored thereon, comprising a first set of instructions for obtaining, at a mobile terminal, at least one radio condition measurement, a second set of instructions for comparing the radio condition measurement to historical radio condition data and a third set of instructions for initiating, at the mobile terminal, an adjustment to at least one Radio Resource Management (RRM) parameter if the comparison determines that adjustment is warranted.

A further related aspect is defined by at least one processor device, implemented in a communication device. The processor device is configured to perform the operations of obtaining, at a mobile terminal, at least one radio condition measurement, comparing the at least one current radio condition measurement to historical radio condition data and initiating, at the mobile terminal, an adjustment to at least one Radio Resource Management (RRM) parameter if the comparison determines that adjustment is warranted.

Yet a further aspect is defined by a wireless communication device that includes a computer platform including a processing engine and a memory unit. The device also includes a RRM parameter adjustment module that is stored in the memory unit and executable by the processing engine. The RRM parameter adjustment module includes RRM parameter adjustment logic operable for comparing at least one current radio condition measurement, such as received power, interference, mobile transmit power or the like, to historical radio condition data and initiating an adjustment to at least one Radio Resource Management (RRM) parameter if the comparison determines that adjustment is warranted.

In one aspect, the device may store historical performance indicator data, such as call drop data, call set-up success rate data, average data rate data and end-to-end delay data and the comparison between the radio condition measurements and the historical data may involve comparing the radio condition measurements to historical radio condition data having associated historical performance indicator data. In such an aspect, the device may also store historical performance indicator standards, such as call drop standard, call set-up standard, average data rate standard, end-to-end delay standard or the like and determining if adjustment is warranted may be based on a predetermined difference between the associated historical performance indicator data and at least one corresponding predetermined performance indicator standard.

In an alternate aspect, the device may store historical radio condition adjustment ranges and determining if adjustment is warranted may be based on a comparison determining that the at least one radio resource management parameter is within a historical radio condition adjustment range.

Additionally, the wireless communication device may include a geographic location-determining mechanism, such as a Global Positioning System (GPS) sensor or the like. In such aspects, the adjustment logic may further be operable to obtain, from the geographic location-determining mechanism, a geographic location associated with the at least one radio condition measurement and operable to compare the at least one radio condition measurement and the geographic location to historical radio condition data that includes historical geographic location data. In another aspect, the wireless device may include a time counter mechanism. In such aspects, the adjustment logic may be further operable to obtain, from the time counter mechanism, a time parameter associated with the at least one radio condition measurement and make an adjustment based on the time parameter, or in other aspects, to compare the at least one radio condition measurement and the time parameter to historical radio condition data that includes corresponding time data in order to determine if an adjustment is warranted.

A further aspect is provided for by a method for configuring mobile terminal-based radio resource management at a network device. The method includes providing at least one performance indicator standard, such as a call drop standard, a call set-up success rate standard, an average data rate standard, an end-to-end delay standard, adjustment range standards or the like and generating a Parameter Adjustment Configuration Message (PACM) comprising the at least one performance indicator standard. Subsequently, the PACM is communicated to a communication device. The at least one performance indicator standard is operable in determining at the communication device if an adjustment to the Radio Resource Management (RRM) is warranted. The at least one performance indicator standard provides a basis for an adjustment to at least one radio resource management parameter based on a predetermined difference between the at least one performance indicator standard and historical performance indicator data associated with historical radio condition data corresponding to a current radio condition measurement by the communication device.

A related aspect is defined by a computer readable medium including instructions stored thereon, comprising a first set of instructions for providing at least one performance indicator standard, a second set of instructions for generating a Parameter Adjustment Configuration Message (PACM) comprising the at lest one performance indicator standard and a third set of instructions for communicating the PACM to a communication device. The at least one performance indicator standard is operable in determining at the communication device if an adjustment to the Radio Resource Management (RRM) is warranted.

A further related aspect is provided for by at least one processor device, implemented in a communication device and configured to perform the operations of providing at least one performance indicator standard, generating a Parameter Adjustment Configuration Message (PACM) comprising the at least one performance indicator standard and communicating the PACM to a communication device. The at least one performance indicator standard is operable in determining at the communication device if an adjustment to the Radio Resource Management (RRM) is warranted.

Yet another aspect is defined by a network device that includes a computer platform including a processing engine and a memory unit. The network device further includes a Radio Resource Management (RRM) configuration module stored in the memory unit, executable by the processing engine and operable for providing at least one performance indicator standard, generating a Parameter Adjustment Configuration Message (PACM) comprising the performance indicator standards and communicating the PACM to a communication device. The at least one performance indicator standard is operable in determining at the communication device if an adjustment to the Radio Resource Management (RRM) is warranted.

As such, the present aspects provide for methods and devices for mobile terminal-based Radio Resource Management (RRM) and network optimization. As described, the mobile terminal measures or otherwise obtains radio condition measurements, such as received power, interference, mobile transmit power and the like. The radio condition measurements are compared against historical data and based on the comparison a determination can be made as to whether adjustment of RRM parameters is warranted. By providing for RRM management at the mobile terminal level, as opposed to a cell or RNC level, better granularity of management is realized in the overall radio network. Individual mobile terminals can better tailor their radio resource needs to meet their conditions of use and, as such better overall service can be realized by the individual mobile terminals in the network.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Further, like numbers refer to like elements throughout.

Figure 1:
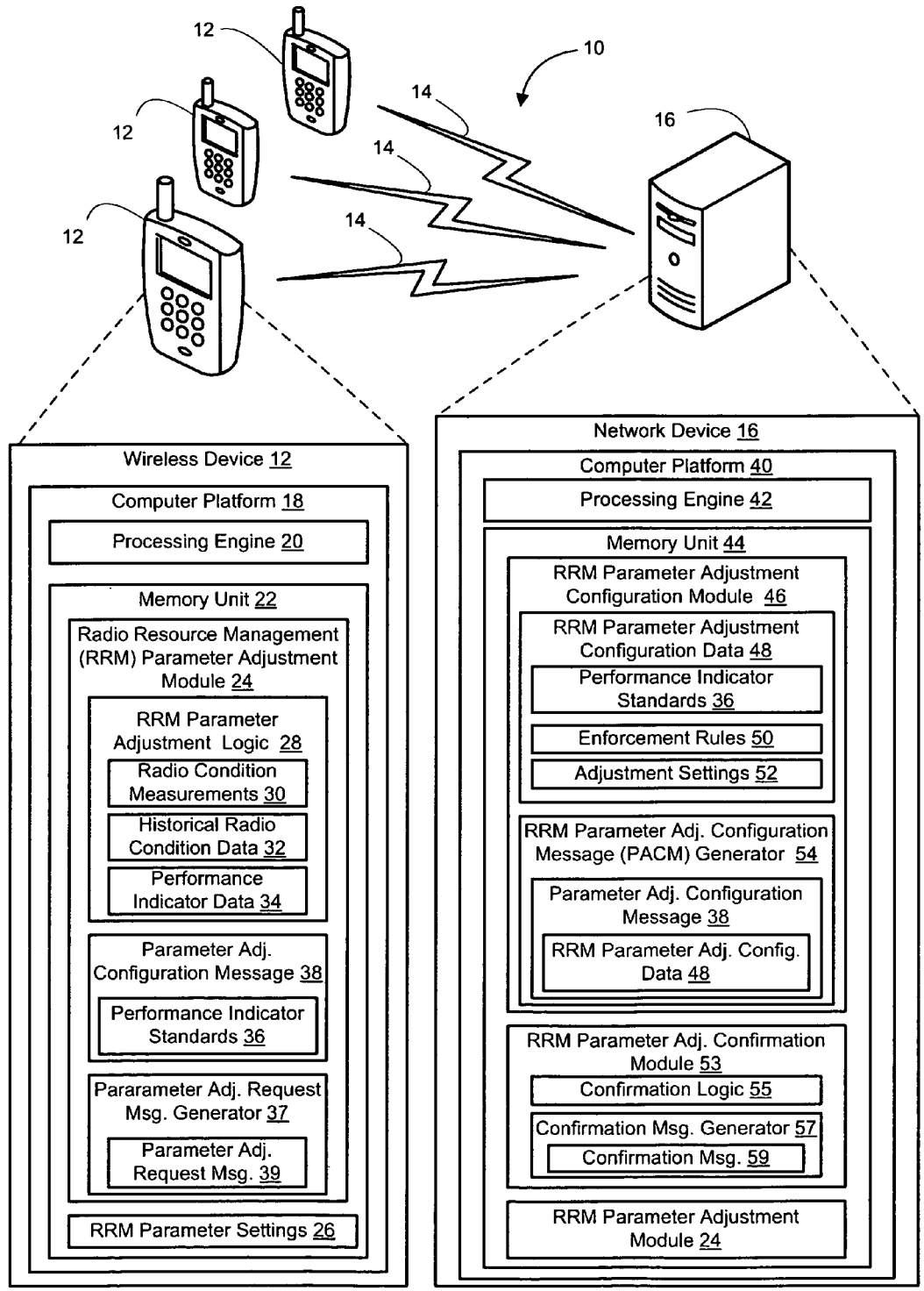
FIG. 1 is a schematic diagram of a system for providing mobile-terminal based Radio Resource Management (RRM), according to one aspect.

According to one aspect, FIG. 1 provides a schematic diagram representation of a system for providing mobile terminal-based Radio Resource Management (RRM) and network optimization. The system 10 includes a plurality of mobile terminals 12 (i.e., wireless communication devices) that communicate through wireless network 14 with network device 16, such as Radio Network Controller (RNC) or the like.

The mobile terminal 12 may include computer platform 18 that includes processing engine 20 that is in communication with memory unit 22. The memory unit may include an a Radio Resource Management (RRM) parameter adjustment module 24 executable by the processing engine 20 and operable to determine whether RRM parameters 26 should be adjusted and, if adjustment is determined, initiate the adjustment. RRM parameters may include, but are not limited to, inter-Radio Access Technology (i-RAT) handover parameters, referred to as hard handover parameters, cell-to-cell handover parameters, referred to as soft handover parameters, serving cell change parameters, rate switching parameters and the like.

The RRM parameter adjustment module 24 includes RRM parameter adjustment logic 28 operable to compare radio condition measurements 30, such as received power, power-to-interference ratio, mobile transmit power and the like, to historical radio condition data 32 to determine if adjustment to the RRM parameters is warranted. In some alternate aspects, the RRM parameter adjustment logic 28 will compare the radio condition measurements 30 to historical radio condition data 32 and associated performance indicator data 34. Performance indicator data 34 may include, but is not limited to, call drop data, call set-up success rate data, average data rate data, end-to-end delay data and the like. In other aspects, the adjustment logic 28 may further be operable to obtain a geographic location associated with the radio condition measurements and compare the radio condition measurements and the associated geographic location to historical radio condition data that includes historical geographic location data. In other aspects, the adjustment logic may be further operable to obtain a time parameter associated with the radio condition measurements and, in some aspects, may further compare the radio condition measurements and the corresponding time parameter to historical radio condition data that includes time data. For example, the time parameter may include, but is not limited to, a time of day and a time interval. Further, for example, the adjustment logic may or may not make an adjustment depending on the time of day associated with the radio condition measurements, such as if the adjustment would require too many resources during a busy time of day, or such as if the radio condition measurements appear to be an anomaly, or a one time issue, for the time of day when compared to historical information. Additionally, for example, the adjustment logic may or may not make an adjustment depending on the time interval, i.e. a time period, over which with the radio condition measurements have been experienced. For example, an adjustment may not be made if the radio condition measurements have not been experienced for a time interval greater than some predetermined threshold. Further, for example, an adjustment may not be made if the radio condition measurements appear to be an anomaly, or a one time issue, for the given time interval when compared to historical information.

Once the RRM parameter adjustment logic 28 has determined that adjustment is warranted based on historical radio condition data 32 and, optionally, the associated performance indicator data 34, the logic 28 may determine the RRM parameters requiring adjustment and the requisite adjustment amount to be afforded to each RRM parameter being adjusted. In some aspects, once the RRM parameter adjustment logic 28 has determined that adjustment is warranted, the logic will check performance indicator standards 36 to determine if adjustment to RRM parameters is allowable. For example, performance indicator standards 36 may comprise key performance indicators (KPI) associated with a network carrier or other service provider or manufacturer of mobile terminal-related equipment. The performance indicator standards 36 may include, but are not limited to, an acceptable/unacceptable minimum, maximum and/or rate of call drops, an acceptable/unacceptable minimum, maximum and/or rate of successful call set-ups, an acceptable/unacceptable minimum, maximum and/or rate of data throughput, an acceptable/unacceptable minimum, maximum and/or rate end-to-end-end delay and the like. The performance indicator standards 36 may be communicated from network device 16 via a parameter adjustment configuration message 38. The message 38 provides for dynamic update of the performance indicator standards 36 as dictated by the network. Alternatively, the performance indicator standards 36 may be hard coded within the RRM parameter adjustment module 24.

Additionally, the RRM parameter adjustment module 24 may include a RRM parameter adjustment request message generator 37 operable for generating an adjustment request message 39, which includes the proposed adjustments and adjustment amounts. The message 39 is subsequently communicated to a network device 16, such as a RNC, which accepts or rejects the parameter adjustments based on current network loads, network resource availability and the like.

The network device 16 may include computer platform 40 that includes processing engine 42 that is in communication with memory unit 44. The memory unit 44 may include an a Radio Resource Management (RRM) parameter adjustment configuration module 46 executable by the processing engine 42 and operable for providing selectable RRM parameter adjustment configuration data 48, such as performance indicator standards 36, adjustment enforcement rules 50, adjustment settings 52 and the like. The RRM parameter adjustment configuration module 42 may also include RRM Parameter Adjustment Configuration Message (PACM) generator 54 operable for generating a PACM 38 that includes the selected RRM parameter adjustment configuration data 48 that is subsequently sent to one or more of the plurality of mobile terminals 12 to configure RRM parameter adjustment on the terminals. The PACM 38 allows a network administrator, or the like, to dynamically control the mobile terminal-based adjustment of RRM parameters by defining the rules and settings associated with the adjustment process. In this regard, the network maintains control over the allocation of network resources and may limit the mobile terminal-based adjustment of RRM parameters if network resource allocation warrants such.

In some aspects, the network device may include a RRM parameter adjustment confirmation module 53 operable to receive a parameter adjustment request from mobile terminal 12 and execute parameter adjustment confirmation logic 55, which is operable to determine if adjustment to the parameters is acceptable based on current or perceived network conditions, network resource availability and the like. Parameter adjustment may be accepted/rejected in whole or individual parameter adjustments may be accepted or rejected. The parameter adjustment confirmation module 55 may additionally include parameter adjustment confirmation message generator 57 operable for generating a confirmation message that accepts and/or rejects proposed RRM parameter adjustments and is subsequently communicated to the mobile terminal 12.

In addition, memory unit 44 of network device 16 may include RRM parameter adjustment module 24, and the network device may be responsible for communicating the RRM parameter adjustment module 24 to deployed mobile terminals 12. Alternatively, one or more of the mobile terminals 12 may be preconfigured with the RRM parameter adjustment module 24 at the manufacturer or may otherwise download the module on to the mobile terminal.

Figure 2:
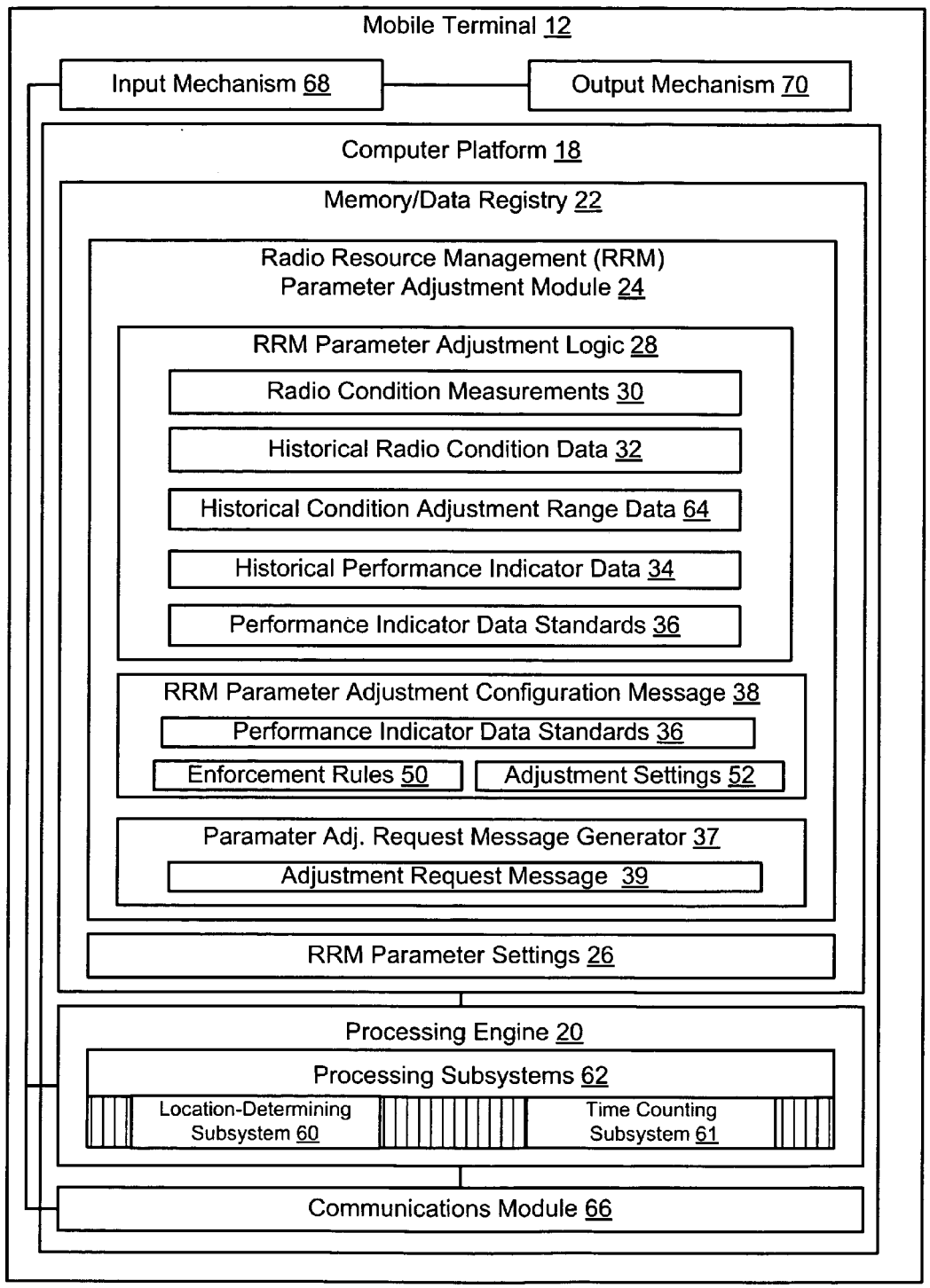
FIG. 2 is a block diagram of a mobile terminal that is operable to provide for mobile terminal-based radio resource management, according to one aspect.

Referring to FIG. 2, according to one aspect, a block diagram representation of a wireless communication device, such as mobile terminal 12 operable for providing Radio Resource Management (RRM) parameter adjustment, is depicted. The mobile terminal 12 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The communication device can be a remote-slave, or other device that does not have an end-user thereof but simply communicates data across the wireless or wired network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, wireless computers or any combination or sub-combination thereof.

The communication device 12 includes computer platform 18 that can transmit data across a wireless or wired network, and that can receive and execute routines and applications and optionally display data transmitted from network device 16, such as a RNC or another computer device connected to wireless network 14. Computer platform 18 includes a memory unit/data registry 22, which may comprise volatile and nonvolatile memory such as read-only and/or random-access memory (RAM and ROM), EPROM, EEPROM, flash cards, or any memory common to computer platforms. Further, memory unit 22 may include one or more flash memory cells, or may be any secondary or tertiary storage device, such as magnetic media, optical media, tape, or soft or hard disk.

Further, computer platform 18 also includes a processing engine 20, which may be an application-specific integrated circuit ("ASIC"), or other chipset, processor, logic circuit, or other data processing device. Processing engine 20 includes various processing subsystems 62 embodied in hardware, firmware, software, and combinations thereof, that enable the functionality of mobile terminal 12 and the operability of the communication device on a wireless network. For example, processing subsystems 62 allow for initiating and maintaining communications, and exchanging data, with other networked devices. In present aspects, in which the RRM parameter adjustment 24 relies on subsystems to provide positional data, time data and the like, the subsystems may include, but are not limited to, position sensing mechanisms, such as Global Positioning System (GPS) sensors, clocking mechanisms and the like. Positional data, time data and the like may be correlated with the current radio condition measurement data, the historical radio condition data or both to determine if adjustment to the RRM parameters is warranted. In aspects in which the mobile terminal is defined as a cellular telephone the communications processing engine 20 may additionally include one or a combination of processing subsystems 62, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 62 of processing engine 20 may include any subsystem components that interact with applications executing on computer platform 18. For example, processing subsystems 62 may include any subsystem components that receive data reads and data writes from API 60 on behalf of the RRM parameter adjustment module 24.

The data registry 22 of computer platform 60 includes an a Radio Resource Management (RRM) parameter adjustment module 24 executable by the processing engine 20 and operable to determine whether RRM parameters 26 should be adjusted and, if adjustment is determined, initiate the adjustment. RRM parameters 26 may include, but are not limited to, inter-Radio Access Technology (I-RAT) handover, referred to as hard handover, parameters, cell-to-cell handover, referred to as soft handover, parameters, serving cell change parameters, rate switching parameters and the like.

The RRM parameter adjustment module 24 includes RRM parameter adjustment logic 28 operable to compare radio condition measurements 30, such as received power, power-to-interference ratio, mobile transmit power and the like, to historical radio condition data 32 to determine if adjustment to the RRM parameters is warranted. It is noted that the RRM parameter adjustment logic 30 may employ various methods, schemes, processes and the like to determine if parameter adjustment is warranted and, if so, the requisite parameter to adjust and the amount of adjustment. As such, the aspects herein described do not limit the invention as described and claimed. The aspects herein described related to the RRM parameter adjustment logic are by way of example only and other methods may also used to determine RRM parameter adjustment.

Figure 3:
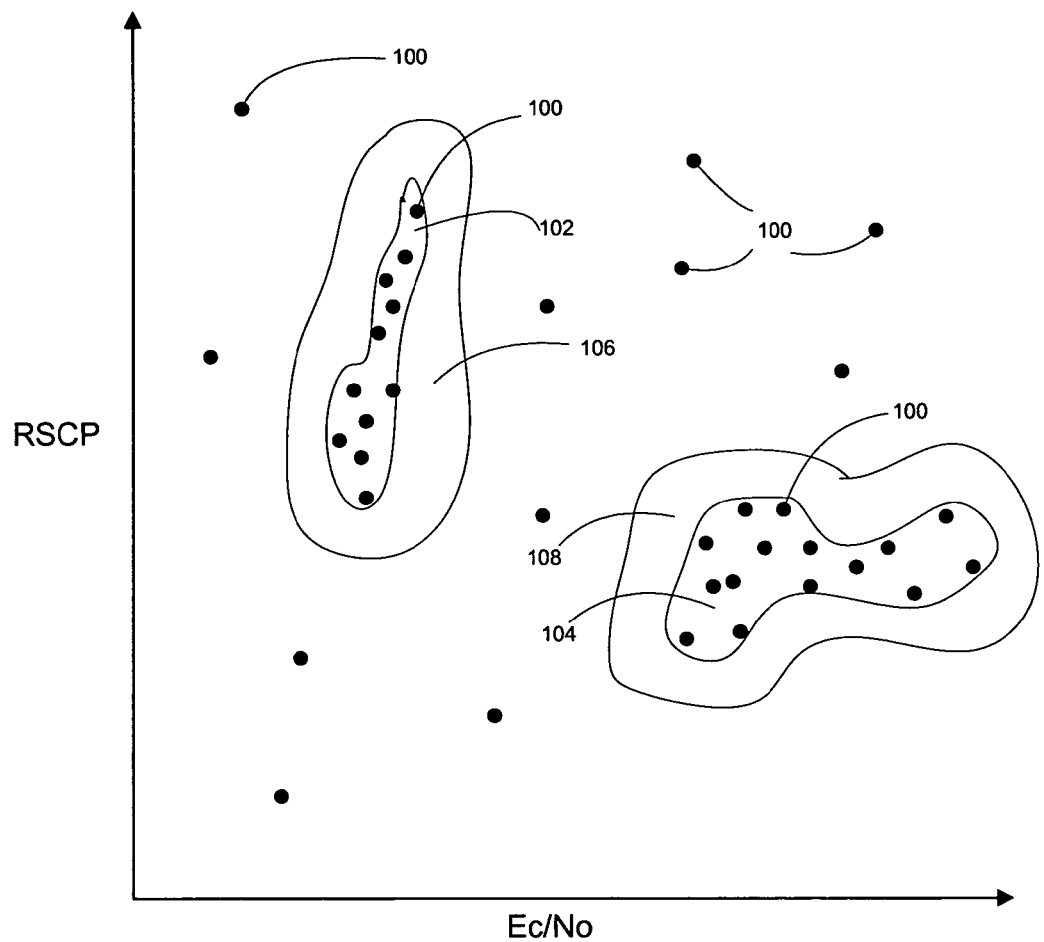
FIG. 3 is an example of a Cartesian graph of historical radio condition data and associated historical radio condition adjustment boundaries, according to one aspect.

In one aspect, RRM parameter adjustment logic may compare current radio condition measurements 30 to historical radio condition adjustment range data 64 to determine whether the current conditions warrant RRM parameter adjustment. FIG. 3 provides an x-y graphical representation of historical radio condition adjustment range data. The x-axis represents signal strength-to-interference ratio in the form of energy per chip divided by power density in the band (Ec/No) and the y-axis represents signal strength in the form of Received Signal Code Power (RSCP). Data points 100 represent historical radio condition data in instances in which the mobile terminal has experienced service problems, such as a call-set-up failure, a call drop failure, service outage or the like. The RRM parameter adjustment logic 28 or other logic within the RRM parameter adjustment module 24 may determine regions in which high concentrations of service problems exist. For example, in the illustrated aspect of FIG. 3, region 102 signifies a high concentration of call set-up failures and region 104 signifies a high concentration of call drop failures. Once these regions have been defined, either manually or automatically through the use of predetermined algorithms, heuristics, etc., the parameter adjustment logic 28 or other logic within the RRM parameter adjustment module 24 may determine parameter adjustment boundaries. Parameter adjustment boundaries define those areas in which radio conditions are in the proximate vicinity of potential service failures. For example, in the illustrated aspect of FIG. 3, boundary region 106 defines conditions for a potential call set-up failure and, thus, if current radio condition RSCP and Ec/No measurements fall within boundary region 106 adjustment to the RRM parameters may be warranted. Additionally, boundary region 108 defines conditions for a potential call drop failure and, thus, if current radio condition RSCP and Ec/No measurements fall within boundary region 108 adjustment to the RRM parameters may be warranted. It is noted that in some instances, even though current radio conditions may be within a defined boundary region, adjustment may not be warranted if the performance indicator standards, such as a call drop limit, a call set-up success rate limit, an out-of-service limit or the like, have not been met.

In some alternate aspects, the RRM parameter adjustment logic 28 will compare the radio condition measurements 30 to historical radio condition data 32 and associated historical performance indicator data 34. Historical performance indicator data 34 may include, but is not limited to, historical call drop data, historical call set-up data, historical average data rate data, historical end-to-end delay data and the like. For example, logic 30 may compare the current radio condition data 32 to the historical radio condition data 34 and determine the instances in which the historical data matches or proximately matches the current radio conditions. Once the matching instances have been determined, the logic can then determine performance indicator data related to those matching instances, such as the call drop rate, the call set-up rate, out-of-service rate, data transmission rate or the like. If the historical performance indicator data fails to meet a predefined performance indicator standard 36 then, logic 30 may determine that adjustment to the RRM parameters is warranted. For example, if the current radio conditions correlate to historical radio condition data in which the historical performance indicator for call drop indicates that a call is dropped at a 75% rate in instances in which the prior radio conditions match or proximately match the current radio conditions then, the 75% rate is compared to the performance index standard, which in this example may be a call drop rate of no less than 95%. Since the historical performance standard of 75% fails to meet the acceptable performance standard of 95%, the logic determines that adjustment to the RRM parameters is warranted. The performance indicator standards 36 may include, but are not limited to, an acceptable/unacceptable minimum, maximum and/or rate of call drops, an acceptable/unacceptable minimum, maximum and/or rate of call set-up success rates, an acceptable/unacceptable minimum, maximum and/or rate of data throughput, an acceptable/unacceptable minimum, maximum and/or rate of end-to-end-end delay and the like.

Figure 4:
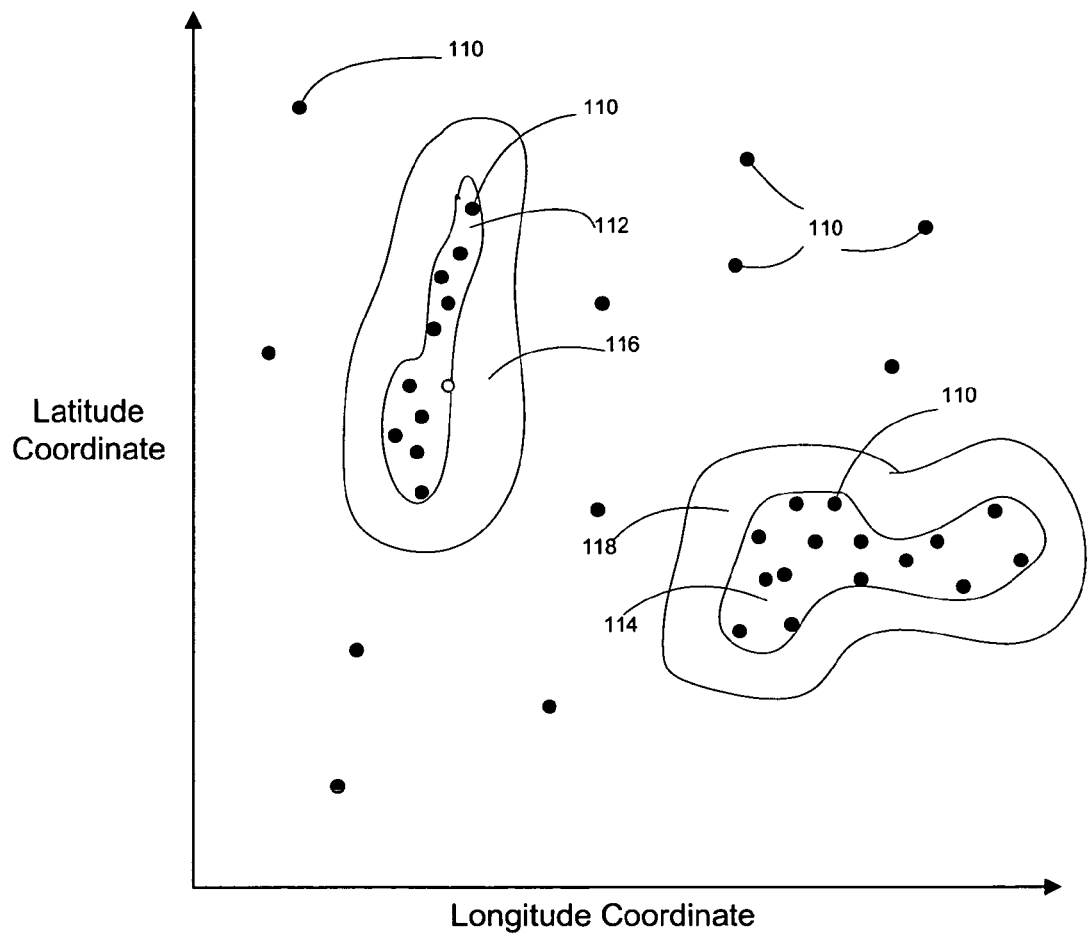
FIG. 4 is an example of a Cartesian graph of historical geographic location data and associated historical geographic location adjustment boundaries, according to one aspect.

In other alternate aspects, the RRM adjustment logic 28 may further be operable to obtain, from the geographic location-determining subsystem 60, a geographic location associated with the radio condition measurement and compare the radio condition measurement and the geographic location to historical radio condition data that includes historical geographic location data. FIG. 4 provides an x-y graphical representation of historical geographic location adjustment range data. The x-axis represents longitude coordinates and the y-axis represents latitude coordinates. Data points 110 represent historical geographic locations in instances in which the mobile terminal has experienced service problems, such as a call set-up failure, a call drop failure, service outage or the like. The RRM parameter adjustment logic 28 or other logic within the RRM parameter adjustment module 24 may determine geographic regions in which high concentrations of service problems exist. For example, in the illustrated aspect of FIG. 4, geographic region 112 signifies a geographic region having a high concentration of call set-up failures and geographic region 114 signifies a geographic region having a high concentration of call drop failures. Once these regions have been defined, either manually or automatically through the use of predetermined algorithms, heuristics, etc., the parameter adjustment logic 28 or other logic within the RRM parameter adjustment module 24 may determine parameter adjustment boundaries. Parameter adjustment geographic boundaries define those areas in which radio conditions are in the proximate vicinity of potential service failures. For example, in the illustrated aspect of FIG. 4, geographic boundary region 116 defines conditions for a potential call set-up failure and, thus, if the current geographic location falls within geographic boundary region 116, an adjustment to the RRM parameters may be warranted. Additionally, geographic boundary region 118 defines conditions for a potential call drop failure and, thus, if the current geographic location falls within geographic boundary region 118, an adjustment to the RRM parameters may be warranted. It is noted that in some instances, even though current geographic location may be within a defined geographic boundary region, adjustment may not be warranted if the performance indicator standards, such as a call drop limit, a call set-up success rate limit, an out-of-service limit or the like, have not been met.

In another aspect, the RRM adjustment logic 28 may be further operable to obtain, from the time counter subsystem 61, a time parameter associated with the radio condition measurements and then utilize the time parameter in making adjustment decisions. For example, in some aspects, adjustment logic 28 may make an adjustment based solely on the time parameter, while in other aspects, the adjustment logic 28 may compare the radio condition measurements and the associated time parameter to historical radio condition data that includes time data in order to determine whether or not a parameter adjustment is warranted.

The performance indicator standards 36 may be communicated from network device 16 via a Parameter Adjustment Configuration Message 38. Additionally, the PACM message, which may be included within any other communication from the network, may include other configuration data, such as enforcement rules 50, adjustment settings 52 and the like. The message 38 provides for dynamic update of the performance indicator standards and other RRM parameter adjustment configuration data as dictated by the network. Alternatively, the performance indicator standards and other configuration data may be hard coded within the RRM parameter adjustment module 24.

Once the RRM parameter adjustment logic 28 has determined that adjustment is warranted based on historical radio condition data 32, the logic 28 may determine the RRM parameters requiring adjustment and the requisite adjustment amount to be afforded to each RRM parameter being adjusted. For example, in some aspects, logic 28 may include algorithms, heuristics, neural networks, decision-making routines, etc., operable to compare historical RRM parameter settings associated with acceptable performance indicators and one or more current radio conditions to current RRM parameter settings and adjusts the current RRM parameters based on a difference between one or more historical parameter settings and one or more current parameter settings. In other aspects, logic 28 may include algorithms, heuristics, neural networks, decision-making routines, etc., comprising known relationships between one or more RRM parameters, one or more radio conditions, and one or more performance indicator. In these aspects, logic 28 may automatically adjust one or more of the current RRM parameter settings based on one or more of these known relationships in order to increase the likelihood of achieving an acceptable performance indicator. Alternatively, the adjustment amount may be determined based on the history of previous adjustment amounts, i.e. adjustments based on trial and error.

Figure 5:
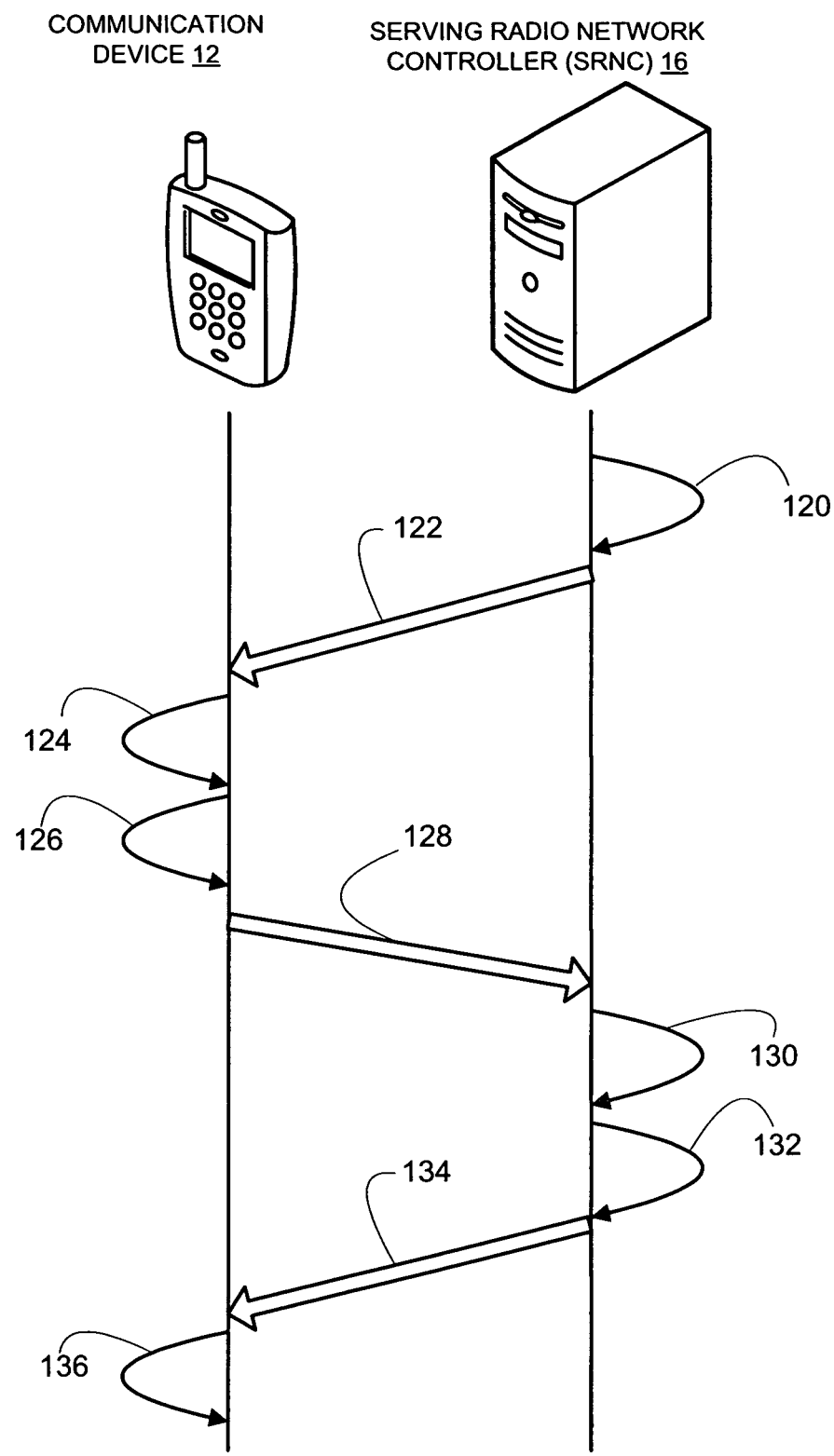
FIG. 5 is a message flow diagram depicting an example of the flow of messages between a mobile terminal and network device, in which the network device confirms the acceptance of the proposed parameter adjustments, according to one aspect.
Figure 6:
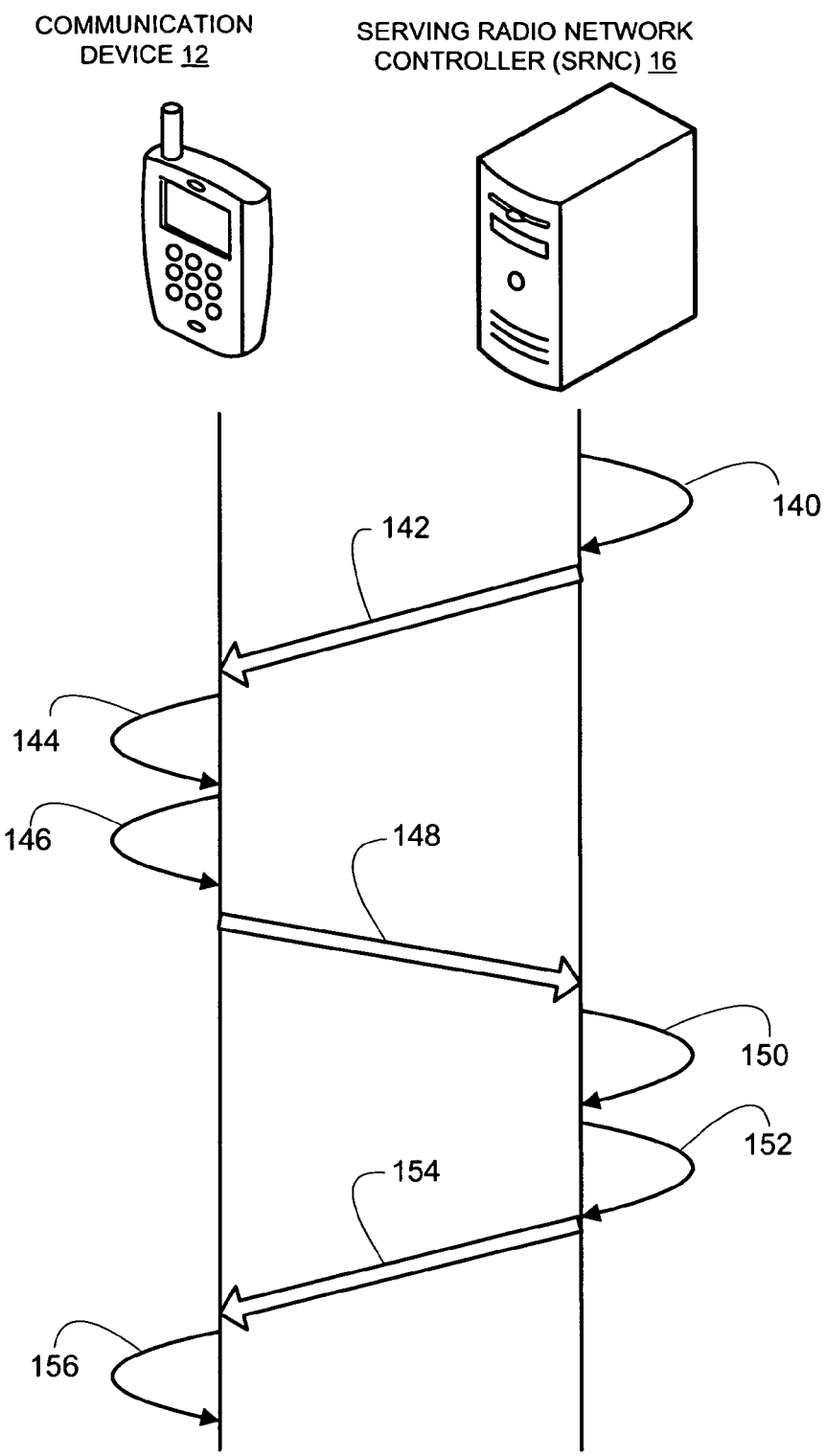
FIG. 6 is a message flow diagram depicting an example of the flow of messages between a mobile terminal and network device, in which the network device confirms the rejection of the proposed parameter adjustments, according to one aspect.

Additionally, the RRM parameter adjustment module 24 may include a RRM parameter adjustment request message generator 37 operable for generating an adjustment request message 39, which includes the proposed adjustments and adjustment amounts. The message 39 is subsequently communicated to a network device 16, such as a RNC, which accepts or rejects the parameter adjustments based on current network loads, network resource availability and the like. FIGS. 5 and 6 illustrate the message flow dialogue that may occur between the communication device 12 and the network device 16. FIG. 5 represents an example in which the network device accepts the proposed parameter adjustments. At Event 120, the network generates a Parameter Adjustment Configuration Message 38 that may include performance indicator data standards 36, enforcement rules 50, adjustment settings 52, and the like the network device communicates a parameter adjustment configuration message. At Event 122, the PACM is communicated to the mobile terminal. As previously noted the contents of the PACM may be included within another communication such as Measurement Control Message (MCM) or the like. At Event 124, the mobile terminal initiates RRM parameter adjustment determination, subsequently determines that adjustment is warranted and determines adjustment amounts. At Event 126, the mobile terminal generates a Parameter Adjustment Request Message (PARM) 39 that includes proposed parameters to be adjusted and the adjustment amounts. At Event 128, the PARM is communicated to the network device. At Event 130, the network device determines if the proposed adjustments are acceptable based on network conditions, available network resources and the like and, at Event 132, the network device generates a Parameter Adjustment Confirmation Message (PACM) 59. At Event 134, the PACM is communicated to the mobile terminal. At Event 136, the mobile terminal implements the new parameters in the radio resource management process.

FIG. 6 represents an example in which the network device rejects the proposed parameter adjustments. At Event 140, the network generates a Parameter Adjustment Configuration Message 38 that may include performance indicator data standards 36, enforcement rules 50, adjustment settings 52, and the like the network device communicates a parameter adjustment configuration message. At Event 142, the PACM is communicated to the mobile terminal. As previously noted the contents of the PACM may be included within another communication such as Measurement Control Message (MCM) or the like. At Event 144, the mobile terminal initiates RRM parameter adjustment determination, subsequently determines that adjustment is warranted and determines adjustment amounts. At Event 146, the mobile terminal generates a Parameter Adjustment Request Message (PARM) 39 that includes proposed parameters to be adjusted and the adjustment amounts. At Event 148, the PARM is communicated to the network device. At Event 150, the network device determines that the proposed adjustments are unacceptable based on network conditions, available network resources and the like and, at Event 152, the network device generates a Parameter Adjustment Confirmation Message (PACM) 59, which serves to reject the proposed adjustments. At Event 154, the PACM is communicated to the mobile terminal. At Event 156, the mobile terminal continues using the unadjusted previous, i.e. previous parameters, in the radio resource management process.

In some aspects, some of the RRM parameters will be implemented for use at the mobile terminal, while other parameters will be implemented for use at a network entity. Thus, once adjustment has been determined to be acceptable, the RRM parameter adjustment module 24 may initiate the adjustment of the RRM parameters at the mobile terminal, or the module may communicate with a network device such that the instructions or adjustments to the RRM parameters are communicated from a network device.

As such, the computer platform 18 of the mobile terminal 12 may further include a communications module 66 embodied in hardware, firmware, software, and combinations thereof, that enables communications among the various components of the mobile terminal 12, as well as between the mobile terminal 12 and wireless network 14. The communication module may include the requisite hardware, firmware, software and/or combinations thereof for establishing a wireless network communication connection. In aspects herein described, the communication module 66 may be operable for communicating the parameter adjustment configuration message 38 to the mobile terminal 12, communicating a parameter adjustment initiation message to a network device or any other communication between the mobile terminal and the network required for mobile-terminal based parameter adjustment.

Additionally, communication device 10 may include input mechanism 68 for generating inputs into communication device, and output mechanism 70 for generating information for consumption by the user of the communication device. For example, input mechanism 68 may include a mechanism such as a key or keyboard, a mouse, a touch-screen display, a microphone, etc. In certain aspects, the input mechanisms 68 provides for user input to activate an application on the communication device. Further, for example, output mechanism 70 may include a display, an audio speaker, a haptic feedback mechanism, etc.

Figure 7:
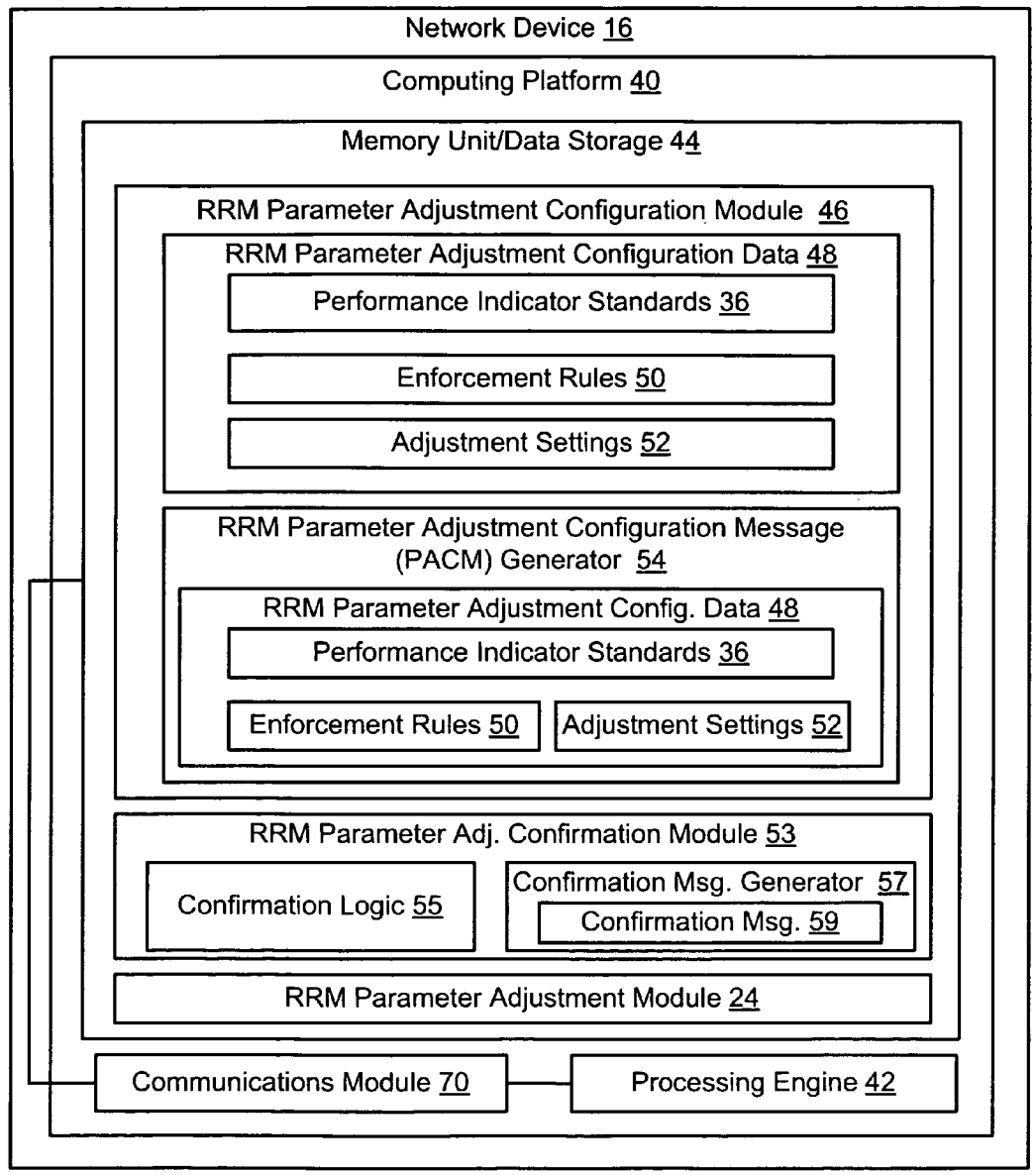
FIG. 7 is a block diagram of a network device that is operable to provide configuration for mobile terminal-based radio resource management, according to one aspect.

Referring to FIG. 7, according to another aspect, a block diagram is illustrated of a network device 16, such as a radio network controller or the like operable for managing radio resources within at least a portion of the wireless network 14. The network device may comprise at least one of any type of server, personal computer, mini computer, mainframe computer, or any special purpose or general computing device. Further, the modules and applications described herein as being operated on or executed by the network device 16 may be executed entirely on the network device 16 or alternatively, in other aspects, separate servers or computer devices may work in concert to provide data in usable formats to parties, and/or to provide a separate layer of control in the data flow between the communication device 12 and the modules and applications executed by network device 16.

The network device 16 has computer platform 40 that can transmit and receive data across wireless network 16, and that can execute routines and applications. Computer platform 40 includes a memory unit 44, which may comprise volatile and nonvolatile memory such as read-only and/or random-access memory (RAM and ROM), EPROM, EEPROM, flash cards, or any memory common to computer platforms. Further, memory unit 44 may include one or more flash memory cells, or may be any secondary or tertiary storage device, such as magnetic media, optical media, tape, or soft or hard disk. Further, computer platform 40 also includes a processing engine 42, which may be an application-specific integrated circuit ("ASIC"), or other chipset, processor, logic circuit, or other data processing device. The computer platform 40 may further include a communications module 70 embodied in hardware, firmware, software, and combinations thereof, that enables communications among the various components of the network device 16, as well as between the network device 16 and wireless network 14. For example, in the described aspects, the communication module is configured to communicate to the mobile terminal 12 the parameter adjustment configuration message 38 and, optionally, receive a parameter adjustment initiation message from a mobile terminal. The communication module may include the requisite hardware, firmware, software and/or combinations thereof for establishing a wireless communication connection.

The memory unit 48 of the network device includes a Radio Resource Management (RRM) parameter adjustment configuration module 46 executable by the processing engine 42 and operable for providing selectable RRM parameter adjustment configuration data 48, such as performance indicator standards 36, adjustment enforcement rules 50, adjustment settings 52 and the like. Performance indicator standards 36 are defined as radio performance limits, thresholds or the like that may used by the RRM parameter adjustment module 24 to determine if RRM parameter adjustment is acceptable. For example, performance indicator standards 36 may include, but are not limited to, an acceptable/unacceptable minimum, maximum and/or rate of call drops, an acceptable/unacceptable minimum, maximum and/or rate of call set-up, an acceptable unacceptable service minimum, maximum and/or rate of service outages or the like. A network administrator or other network operator may be provided a user interface that provides for the selection of RRM parameter adjustment configuration data 48. Adjustment enforcement rules 50 may comprise, for example, particular RRM parameter adjustment logic 28 for use by the respective mobile communication device, or the like. Adjustment settings 52 may comprise, for example, a maximum, a minimum and/or a range of a permissible amount of adjustment associated with a predetermined setting, a specific time of the day adjustment period, user adjustment priority, or other adjustment criteria. For example, adjustments during low-usage periods (e.g. night time) may have less potential negative impact on network resource management. Also, users can be prioritized as to when/how often they can perform parameter adjustments. Further, users might be limited or forbidden to adjust parameters at given locations or during specific events.

Additionally, the RRM parameter adjustment configuration module 42 may also include RRM Parameter Adjustment Configuration Message (PACM) generator 54 operable for generating a PACM 38 that includes the selected RRM parameter adjustment configuration data 48. The PACM is subsequently communicated from the network device to one or more mobile terminals to configure RRM parameter adjustment. Alternatively, the selected RRM parameter adjustment configuration data 48 may be communicated to the mobile terminals as part of any other communication sent from the network device 16, such as the Measurement Control Message (MCM) or the like. The configuration of adjustment parameters at the network device level allows a network administrator, or the like, to dynamically control the mobile terminal-based adjustment of RRM parameters by defining the rules and settings associated with the adjustment process. In this regard, the network maintains control over the allocation of network resources and may limit the mobile terminal-based adjustment of RRM parameters if network resource allocation warrants such.

In addition, memory unit 44 of network device 16 may include RRM parameter adjustment module 24 and the network device may be responsible for downloading or otherwise communicating the RRM parameter adjustment module to one or more mobile terminals 12 in the wireless network 14. Alternatively, the mobile terminals may be preconfigured with the RRM parameter adjustment module 24 at the manufacturer or may otherwise download the module on to the mobile terminal.

Figure 8:
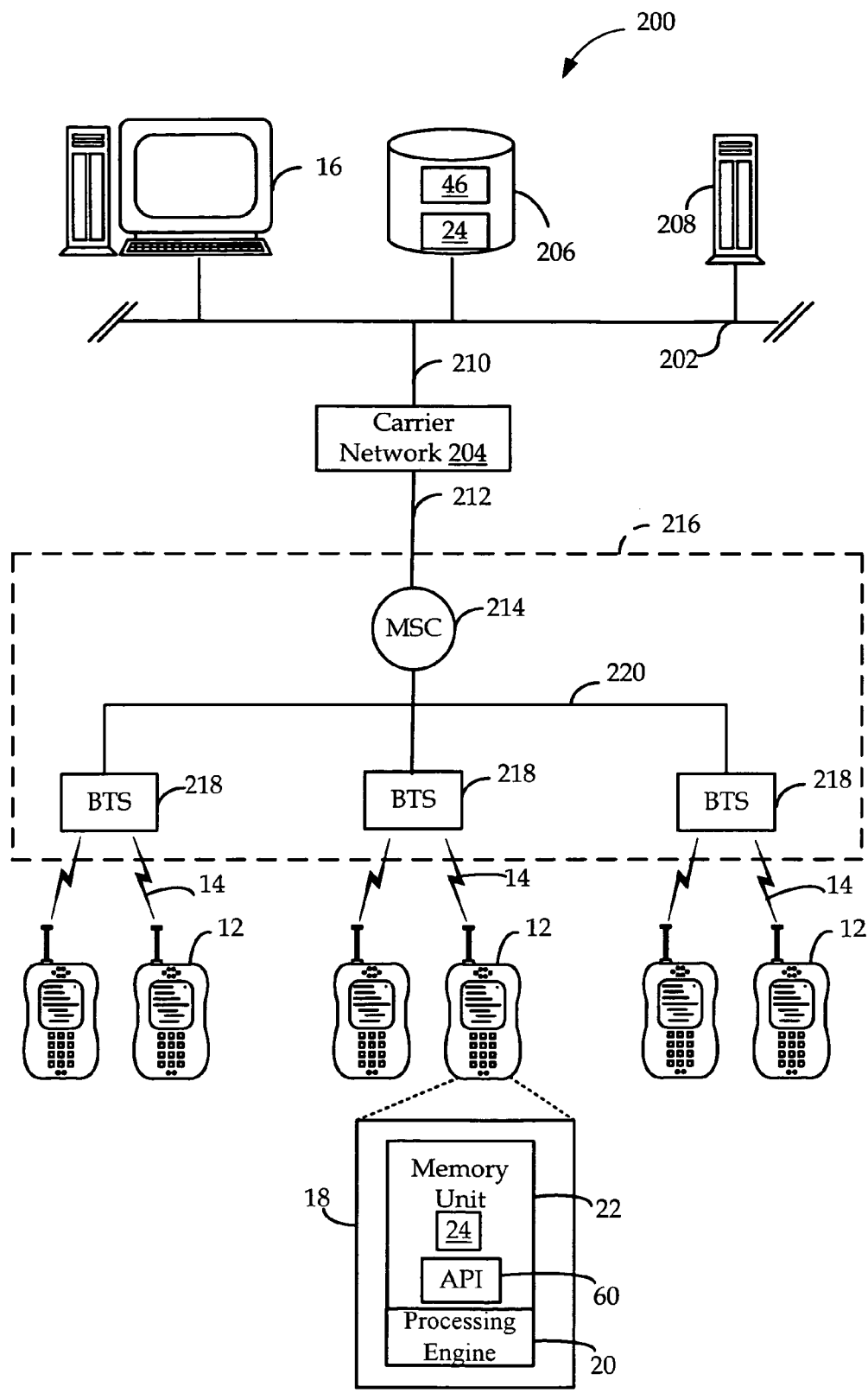
FIG. 8 is schematic diagram of a wireless communication network that includes mobile terminals configured to provide for mobile-terminal based radio resource management, according to one aspect.

Referring to FIG. 8, in one aspect, mobile terminal 12 comprises a wireless communication device, such as a cellular telephone. A cellular telephone system 200 may include wireless network 14 connected to a wired network 202 via a carrier network 204. Wireless communication devices 12 are being manufactured with increased computing capabilities and often can communicate packets including voice and data over wireless network 14. As described earlier, these "smart" wireless devices 12 have APIs 30 resident on their local computer platform 18 that allow software developers to create software applications that operate on the wireless communication device 12, and control certain functionality on the device. FIG. 8 is a representative diagram that more fully illustrates the components of a wireless communication network and the interrelation of the elements of one aspect of the present system. Wireless network 14 is merely exemplary and can include any system whereby remote modules, such as wireless communication devices 12 communicate over-the-air between and among each other and/or between and among components of a wireless network 14, including, without limitation, wireless network carriers and/or servers.

In system 200, network device 16 can be in communication over a wired network 202 (e.g. a local area network, LAN) with a separate network database 206 for storing the RRM parameter adjustment configuration module 46 and/or the RRM parameter adjustment module 24. Further, a data management server 208 may be in communication with network device 16 to provide post-processing capabilities, data flow control, etc. Network device 16, network database 206 and data management server 208 may be present on the cellular telephone system 200 with any other network components that are needed to provide cellular telecommunication services. Network device 16, and/or data management server 208 communicate with carrier network 204 through data links 210 and 212, which may be data links such as the Internet, a secure LAN, WAN, or other network. Carrier network 204 controls messages (generally being data packets) sent to a mobile switching center ("MSC") 214. Further, carrier network 204 communicates with MSC 214 by a network 216, such as the Internet, and/or POTS ("plain old telephone service"). Typically, in network 216, a network or Internet portion transfers data, and the POTS portion transfers voice information. MSC 214 may be connected to multiple base stations ("BTS") 218 by another network 220, such as a data network and/or Internet portion for data transfer and a POTS portion for voice information. BTS 218 ultimately broadcasts messages wirelessly to the wireless communication devices 12, by short messaging service ("SMS"), or other over-the-air methods.

Figure 9:
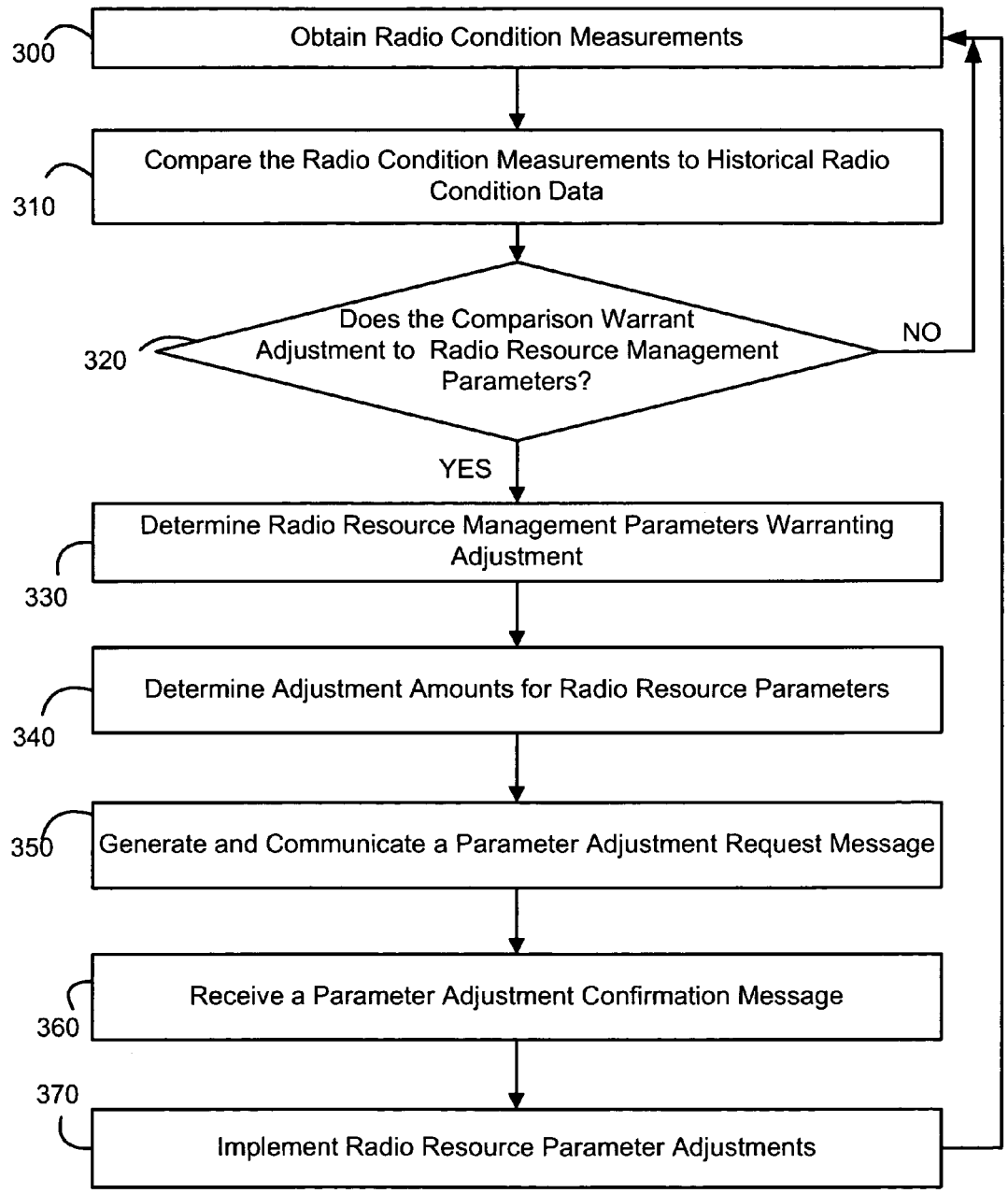
FIG. 9 is a flow diagram of a method for mobile terminal-based radio resource management, according to yet another aspect.

Referring to FIG. 9, a flow diagram is provided of a method for mobile-terminal based Radio Resource Management (RRM). At Event 300, the mobile terminal obtains current radio condition measurements. The radio condition measurements may include, but are not limited to, signal strength, signal strength-to-interference ratio, mobile transmit power and the like. In many aspects the current radio conditions are measured internally within the mobile terminal, however; in alternate aspects the current radio conditions may be measured externally and communicated to the mobile terminal.

Figure 10:
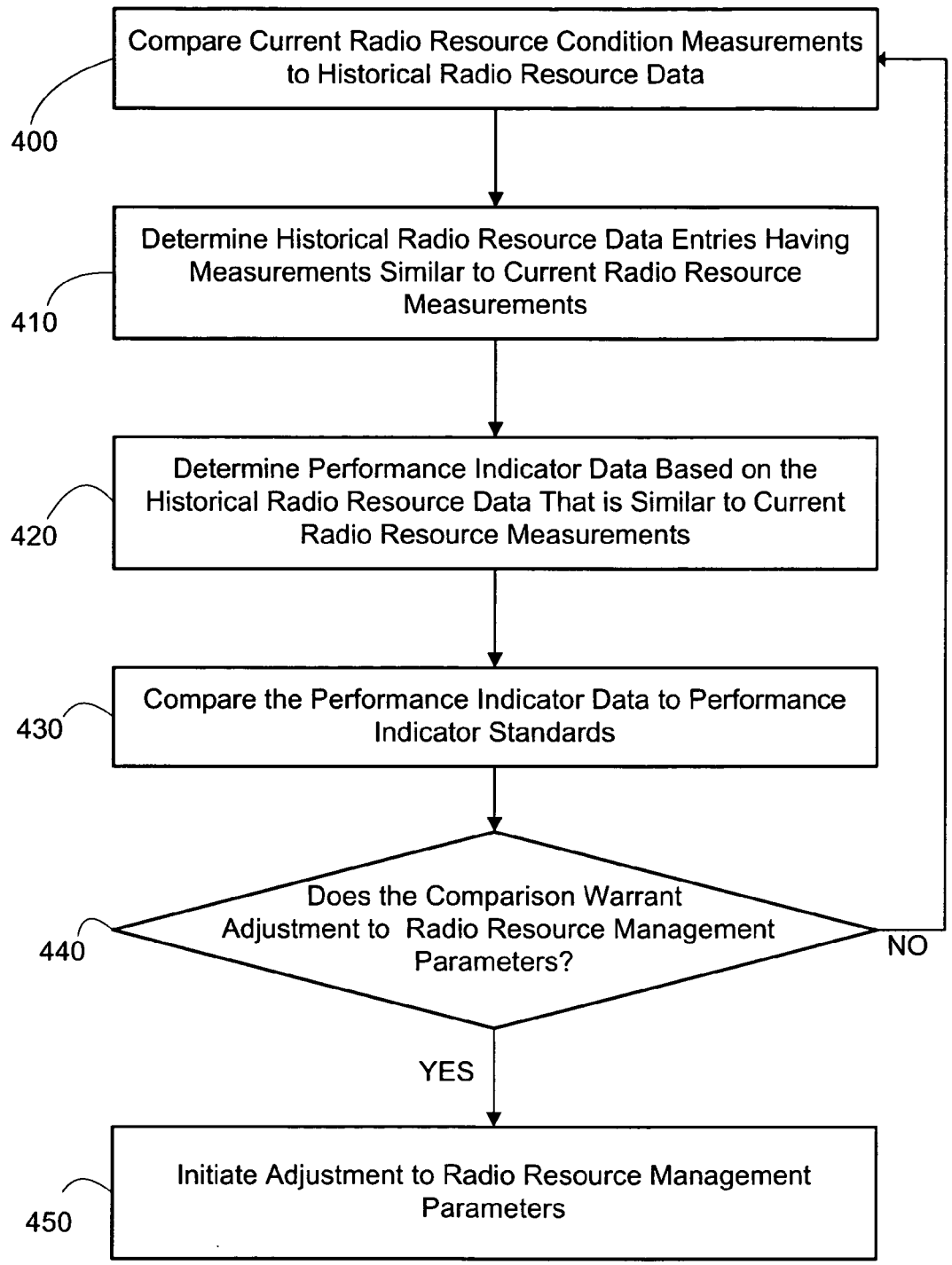
FIG. 10 is a flow diagram of a method for determining radio resource parameter adjustment at a mobile terminal, according to another aspect.

At Event 310, the current radio conditions are compared to historical radio condition data, which is stored at the mobile terminal and, at Event 320, a determination is made as to whether the comparison of the historical radio condition date to the current radio condition data warrants adjustment to the Radio Resource Management (RRM) Parameters. In some aspects, the current radio conditions will be compared to historical radio conditions and associated performance indicator standards. In alternate aspects, the current radio conditions will be associated with a geographic location and/or a time parameter, and in some aspects further compared to historical radio conditions, such as historical geographic location radio conditions and/or historical time-based radio conditions. As previously noted, various methods of comparison and determination of adjustment can be implemented without departing from the inventive concepts herein disclosed. FIG. 10, which will be discussed below, provides for one example of comparison and determination of adjustment. If the comparison determines that adjustment to the RRM parameters is not warranted then, the method returns to Event 300 and further current radio condition measurements are obtained for subsequent comparison to historical radio condition data.

If a determination is made that the comparison does warrant adjustment to the Radio Resource Management Parameters then, at Event 340, a determination is made as to which RRM parameters should be adjusted. The determination of which RRM parameters will be adjusted may be based on historical service problems encountered when the radio conditions are similar to current radio conditions. RRM parameters may include, but are not limited to, hard handover parameters, soft handover parameters, cell re-selection parameters, data rate switching parameters and the like. At Event 350, adjustment amounts are determined for each parameter requiring adjustment. The adjustment amount determination may be based on network resource availability, current radio condition measurements and other factors instrumental in assuring mobile terminal performance and network optimization. At Event 350, the mobile terminal generates and communicates to the network device a Parameter Adjustment Request Message (PARM) that requests from the network confirmation to allow for the adjustment of the parameters. At Event 360, the mobile terminal receives a Parameter Adjustment Confirmation Message (PACM) from the network, which confirms the acceptability of the adjustment or, alternatively rejects the adjustment.

At Event 370, if the confirmation message accepts the adjustment, the mobile terminal implements the RRM parameter adjustments, the method returns to Event 300 and further current radio condition measurements are obtained for subsequent comparison to historical radio condition data.

Referring to FIG. 10, a flow diagram is provided detailing a method for determining whether adjustment to RRM parameters is warranted. The method detailed in the flow diagram is by way of example only, other methods for determining if adjustment to RRM parameters is warranted may also be implemented in accordance with the described aspects. At Event 400, the current radio resource condition measurements are compared to historical radio resource data. Based on the comparison, at Event 410, a determination is made as to which historical radio resource data entries have similar measurement values to current radio condition measurements. In this regard, the term "similar" defines data that matches, as well as, data that is proximate to matching as predefined in the comparison logic. At Event 420, based on the determination of historical radio resource data entries that have similar measurement values to the current radio condition measurements, performance indicator data is determined. Performance indicator data may include, but is not limited to, call set-up data, such as call set-up success rate data, call drop data, such as call drop rates, out of service data, such as out of service rates, average data transmission data, such as average data rate, end-to-end delay data, such as end-to-end delay rates and the like. The performance indicator data will provide an indication of historical performance of the mobile terminal under radio conditions similar to current conditions.

At Event 430, the performance indicator data is compared to performance indicator standards. The performance indicator standards are acceptable/unacceptable limits, thresholds, boundaries, rates and/or the like, which are generally defined by the network, and determine whether adjustment to the RRM parameters is acceptable per network guidelines and/or mobile terminal guidelines. At Event 440, based on the comparison a determination is made as to whether RRM parameter adjustment is warranted. If no adjustment is warranted then the method returns to Event 400 for further comparison of current radio condition measurements to historical radio resource data. If adjustment to the RRM parameters is determined to be warranted then at Event 450 adjustment is initiated. Initiation of adjustment may include determining which parameters to adjust and the amount of adjustment necessary. Initiation of adjustment may take place internally at the mobile terminal or initiation may place, in whole or part, at a network device that is in communication with the mobile terminal.

Figure 11:
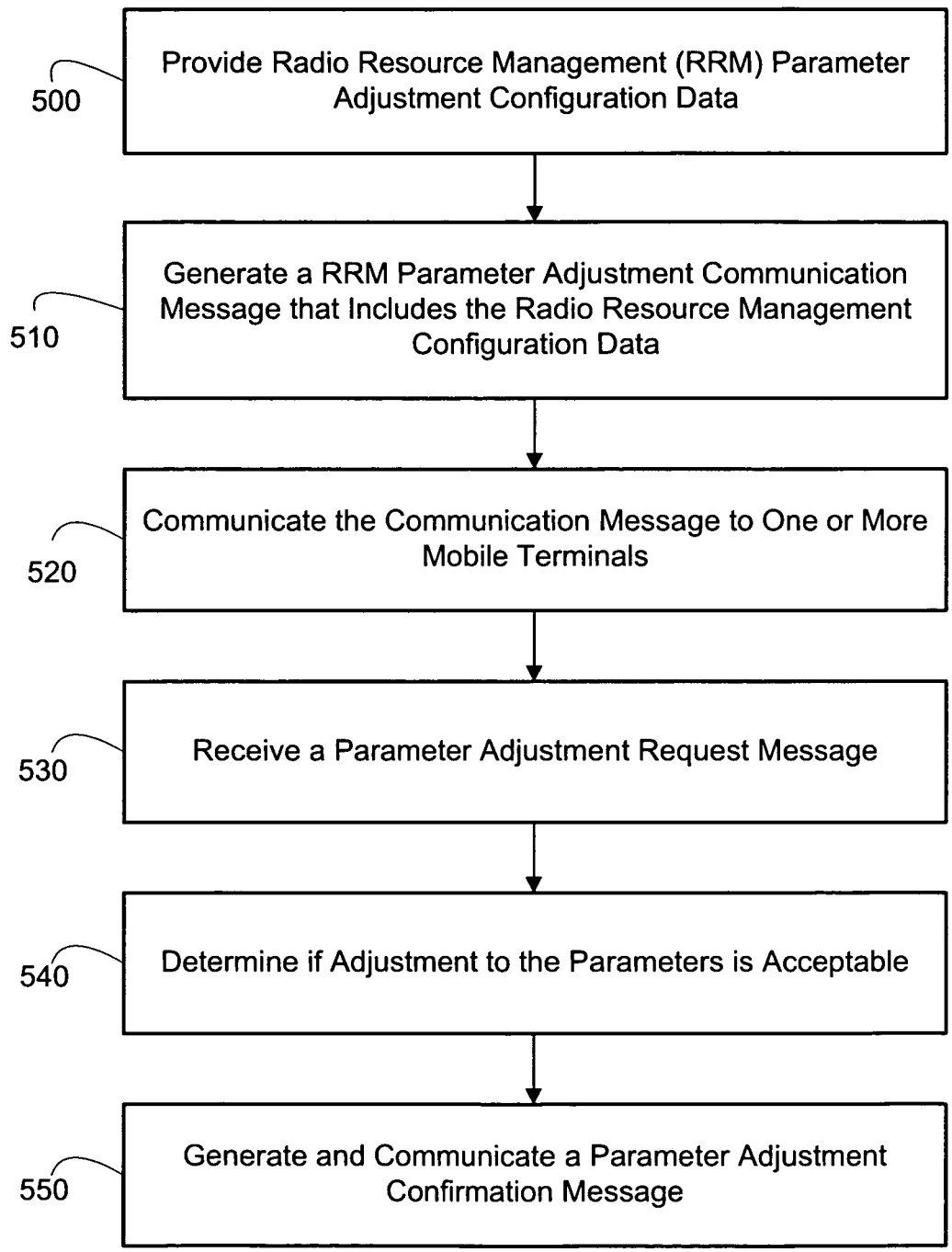
FIG. 11 is a flow diagram of a method for configuring radio resource management parameter adjustment configuration at a network device, according to another aspect.

FIG. 11 is a method for providing Radio Resource Management (RRM) parameter adjustment configuration data at a network device for mobile terminal-based RRM. At Event 500, a network device provides RRM parameter adjustment configuration data. The configuration data may include, but is not limited to, performance indicators standard data, enforcement rules, adjustment settings and the like. The network device may provide for a user-selectable interface for network administrator selection of the configuration data or the configuration data may be automatically generated based on network load, network resource availability and the like. By providing for dynamic network-based configuration of the parameter adjustment configuration data, changes to the adjustment process at the mobile terminal can be accomplished on-the-fly at any point in time to accommodate network resource allocation and insure increased network optimization.

At Event 510, a communication message is generated that includes the RRM parameter adjustment configuration data. The communication message may be configuration data-specific or the communication message may include other information. At Event 520, the network device wirelessly communicates the message to one or more mobile terminals in the network, which subsequently apply the configuration data to the RMM parameter adjustment process/logic.

At Event 530, once a mobile terminal has determined that parameter adjustment is warranted, the network device may receive a parameter adjustment request message (PACM) and, at Event 540, the network device determines if adjustment to the parameters is acceptable based on network conditions, network resource availability and the like. At Event 550, the network device generates and communicates to the mobile terminal a parameter adjustment confirmation message (PACM) which accepts and/or rejects parameter adjustments based on the determination results.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the actions or steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. In other alternatives, the actions or steps of a method or algorithm described in connection with the embodiments disclosed herein may be embodied in a computer readable medium comprising one or any combination of a set of instructions.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, the described aspects provide for mobile terminal-based Radio Resource Management (RRM) and network optimization. As described, the mobile terminal measures or otherwise obtains radio condition measurements, such as received power, interference, mobile transmit power and the like. The radio condition measurements are compared against historical data and based on the comparison a determination can be made as to whether adjustment of RRM parameters is warranted. In alternate aspects, the radio condition measurements may be compared to one or some combination of an adjustment-relevant parameter, such as a geographic location, a performance indicator standard, and a time parameter, whereby adjustment determinations made be made solely on this comparison or in combination with a comparison including historical data. By providing for RRM management at the mobile terminal level, as opposed to a cell or RNC level, better granularity of management is realized in the overall radio network. Individual mobile terminals can better tailor their radio resource needs to meet their conditions of use and, as such better overall service can be realized by the individual mobile terminals in the network.

Many modifications and other aspects of the invention will come to mind to one skilled in the art to which this invention pertains having the benefit of the teachings presented in the foregoing descriptions and the associated drawings. Therefore, it is to be understood that the invention is not to be limited to the specific aspects disclosed and that modifications and other aspects are intended to be included within the scope of the appended claims. Although specific terms are employed herein, they are used in a generic and descriptive sense only and not for purposes of limitation.

What is claimed is:

1. A method for mobile terminal-based radio resource management, comprising:
    obtaining, at a mobile terminal, at least one radio condition measurement;
    comparing the at least one radio condition measurement to historical performance indicator data, wherein the historical performance indicator data comprises at least one of: call drop data, call set-up data, average data rate data, or end-to-end delay data; and
    initiating, at the mobile terminal, an adjustment to at least one Radio Resource Management (RRM) parameter, in response to a determination based, at least in part, on the comparison that the adjustment is warranted, wherein the at least one RRM parameter comprises at least one of a hard network handover parameter, a soft cell handover parameter, a serving cell change parameter, or a rate switching parameter.

2. The method of claim 1, wherein the adjustment to the at least one RRM parameter is based, at least in part, on a predetermined difference between the historical performance indicator data and at least one corresponding predetermined performance indicator standard.

3. The method of claim 2, wherein the at least one corresponding predetermined performance indicator standard comprises at least one of: a call drop standard, a call set-up standard, an average data rate standard, or an end-to-end delay standard.

4. The method of claim 2, further comprising:
    identifying an adjusted value for the at least one RRM parameter.

5. The method of claim 1, wherein initiating, at the mobile terminal, further comprises adjusting, at the mobile terminal, the at least one radio resource management parameter.

6. The method of claim 1, wherein initiating, at the mobile terminal, further comprises sending an adjustment request to a network device.

7. The method of claim 2, further comprising:
    receiving a Parameter Adjustment Configuration Message (PACM) from a network, wherein the PACM comprising the at least one performance indicator standard and adjustment ranges for measured radio conditions.

8. The method of claim 7, wherein the at least one performance indicator standard comprises at least one of: a call drop standard, a call set-up standard, an average data rate standard, or an end-to-end delay standard.

9. The method of claim 1, wherein the at least one radio condition measurement and the historical performance indicator data used in the comparison are associated with a geographic location.

10. The method of claim 9, wherein the historical performance indicator data used in the comparison comprises historical geographic location data associated with geographical regions in which concentrations of service failures exist.

11. The method of claim 10, further comprising:
    determining whether the geographic location falls within a defined geographical boundary.

12. The method of claim 1, wherein the historical performance indicator data comprises historical radio condition adjustment range data associated with energy per chip over band power density (Ec/No).

13. The method of claim 12, wherein the at least one radio condition measurement further comprises at least one of: a received signal code power (RSCP) measurement, an Ec/No measurement, a received power measurement, a mobile transmit power measurement, or an interference measurement.

14. The method of claim 1 further comprising:
    obtaining, at the mobile terminal, a time parameter associated with the at least one radio condition measurement; and
    wherein comparing the at least one radio condition measurement to the historical performance indicator data further comprises comparing the at least one radio condition measurement and the time parameter to the historical performance indicator data and corresponding time data.

15. The method of claim 14, wherein the time parameter comprises at least one of: a time of day, or a time interval.

16. An article comprising:
    a non-transitory computer readable medium including instructions stored thereon that are executable by one or more processors of a mobile terminal to:
    obtain at least one radio condition measurement;

compare the at least one current radio condition measurement to historical performance indicator data, wherein the historical performance indicator data comprises at least one of: call drop data, call set-up data, average data rate data, or end-to-end delay data; and initiate an adjustment to at least one Radio Resource Management (RRM) parameter, in response to a determination based, at least in part, on the comparison that the adjustment is warranted, wherein the at least one RRM parameter comprises at least one of a hard network handover parameter, a soft cell handover parameter, a serving cell change parameter, or a rate switching parameter.

17. The article of claim 16, wherein the adjustment to the at least one RRM parameter is based, at least in part, on a predetermined difference between the historical performance indicator data and at least one corresponding predetermined performance indicator standard.

18. The article of claim 17, wherein the at least one corresponding predetermined performance indicator standard comprises at least one of: a call drop standard, a call set-up standard, an average data rate standard, or an end-to-end delay standard.

19. The article of claim 17, the instructions being further executable by the one or more processors to identify an adjusted value for the at least one RRM parameter.

20. The article of claim 16, the instructions being further executable by the one or more processors to initiate transmission of an adjustment request to a network device.

21. The article of claim 16, wherein the at least one radio condition measurement and the historical performance indicator data used in the comparison are associated with a geographic location.

22. The article of claim 21, wherein the historical performance indicator data used in the comparison comprises historical geographic location data associated with geographical regions in which concentrations of service failures exist.

23. The article of claim 16, wherein the historical performance indicator data comprises historical radio condition adjustment range data associated with energy per chip over band power density (Ec/No).

24. The article of claim 23, wherein the at least one radio condition measurement further comprises at least one of: a received signal code power (RSCP) measurement, an Ec/No measurement, a received power measurement, a mobile transmit power measurement, or an interference measurement.

25. The article of claim 16, the instructions being further executable by the one or more processors to:
obtain a time parameter associated with the at least one radio condition measurement; and
compare the at least one radio condition measurement and the time parameter to the historical performance indicator data and corresponding time data.

26. A communication device comprising:
a communications module; and
at least one processor device to:
obtain at least one radio condition measurement from the communications module;
compare the at least one radio condition measurement to historical performance indicator data, wherein the historical performance indicator data comprises at least one of: call drop data, call set-up data, average data rate data, or end-to-end delay data; and
initiate an adjustment to at least one Radio Resource Management (RRM) parameter, in response to a determination based, at least in part, on the comparison that the adjustment is warranted, wherein the at least one RRM parameter comprises at least one of a hard network handover parameter, a soft cell handover parameter, a serving cell change parameter, or a rate switching parameter.

27. The communication device of claim 26, wherein the adjustment to the at least one RRM parameter is based, at least in part, on a predetermined difference between the historical performance indicator data and at least one corresponding predetermined performance indicator standard.

28. The device of claim 27, the at least one processor device to further identify an adjusted value for the at least one RRM parameter.

29. The communication device of claim 26, the at least one processor device to further initiate transmission of an adjustment request to a network device via the communications module.

30. The device of claim 27, wherein the at least one corresponding predetermined performance indicator standard comprises at least one of: a call drop standard, a call set-up standard, an average data rate standard, or an end-to-end delay standard.

31. The device of claim 26, wherein the at least one radio condition measurement and the historical performance indicator data used in the comparison are associated with a geographic location.

32. The device of claim 31, wherein the historical performance indicator data used in the comparison comprises historical geographic location data associated with geographical regions in which concentrations of service failures exist.

33. The device of claim 26, wherein the historical performance indicator data comprises historical radio condition adjustment range data associated with energy per chip over band power density (Ec/No).

34. The device of claim 33, wherein the at least one radio condition measurement further comprises at least one of: a received signal code power (RSCP) measurement, an Ec/No measurement, a received power measurement, a mobile transmit power measurement, or an interference measurement.

35. The device of claim 26, the one or more processors to further:
obtain a time parameter associated with the at least one radio condition measurement; and
compare the at least one radio condition measurement and the time parameter to the historical performance indicator data and corresponding time data.

36. A communication device, comprising:
means for obtaining at least one radio condition measurement;
means for comparing the at least one radio condition measurement to historical performance indicator data, wherein the historical performance indicator data comprises at least one of: call drop data, call set-up data, average data rate data, or end-to-end delay data; and
means for initiating an adjustment to at least one Radio Resource Management (RRM) parameter, in response to a determination based, at least in part, on the comparison that the adjustment is warranted, wherein the at least one RRM parameter comprises at least one of a hard network handover parameter, a soft cell handover parameter, a serving cell change parameter, or a rate switching parameter.

37. The communication device of claim 36, wherein the adjustment to the at least one RRM parameter is based, at least in part, on a predetermined difference between the historical performance indicator data and at least one corresponding predetermined performance indicator standard.

38. The communication device of claim 37, wherein the at least one corresponding predetermined performance indicator standard comprises at least one of: a call drop standard, a call set-up standard, an average data rate standard, or an end-to-end delay standard.

39. The communication device of claim 36, further comprising means for transmitting an adjustment request to a network device.

40. The communication device of claim 36, wherein the at least one radio condition measurement and the historical performance indicator data used in the comparison are associated with a geographic location.

41. The communication device of claim 40, wherein the historical performance indicator data used in the comparison comprises historical geographic location data associated with geographical regions in which concentrations of service failures exist.

42. The communication device of claim 36, wherein the historical performance indicator data comprises historical radio condition adjustment range data associated with energy per chip over band power density (Ec/No).

43. The communication device of claim 42, wherein the at least one radio condition measurement further comprises at least one of: a received signal code power (RSCP) measurement, an Ec/No measurement, a received power measurement, a mobile transmit power measurement, or an interference measurement.

44. The communication device of claim 36, further comprising:
means for obtaining a time parameter associated with the at least one radio condition measurement; and
means for comparing the at least one radio condition measurement and the time parameter to the historical performance indicator data and corresponding time data.

45. A method comprising:
providing, to a mobile terminal, at least one performance indicator standard comprising at least one of: a call drop standard, a call set-up standard, an average data rate standard, or an end-to-end delay standard; and
obtaining, from the mobile terminal, an adjustment request identifying at least one adjustment to a Radio Resource Management (RRM) parameter as determined by the mobile terminal based, at least in part, on the at least one performance indicator standard, historical performance indicator data, and at least one radio condition measurement, wherein the historical performance indicator data comprises at least one of: call drop data, call set-up data, average data rate data, or end-to-end delay data, wherein the at least one RRM parameter comprises at least one of a hard network handover parameter, a soft cell handover parameter, a serving cell change parameter, or a rate switching parameter.

46. An article comprising:
a non-transitory computer readable medium including instructions stored thereon that are executable by one or more processors of a network device to:
initiate transmission of at least one performance indicator standard to a mobile terminal, the at least one performance indicator standard comprising at least one of: a call drop standard, a call set-up standard, an average data rate standard, or an end-to-end delay standard; and
obtain, from the mobile terminal, an adjustment request identifying at least one adjustment to a Radio Resource Management (RRM) parameter as determined by the mobile terminal based, at least in part, on the at least one performance indicator standard, historical performance indicator data, and at least one radio condition measurement, wherein the historical performance indicator data comprises at least one of: call drop data, call set-up data, average data rate data, or end-to-end delay data, and wherein the at least one RRM parameter comprises at least one of a hard network handover parameter, a soft cell handover parameter, a serving cell change parameter, or a rate switching parameter.

47. A network device comprising:
a communications module; and
at least one processor device to:
provide at least one performance indicator standard to a mobile terminal via the communications module, the at least one performance indicator standard comprising at least one of: a call drop standard, a call set-up standard, an average data rate standard, or an end-to-end delay standard; and
obtain, from the mobile terminal via the communications module, an adjustment request identifying at least one adjustment to a Radio Resource Management (RRM) parameter as determined by the mobile terminal based, at least in part, on the at least one performance indicator standard, historical performance indicator data, and at least one radio condition measurement, wherein the historical performance indicator data comprises at least one of: call drop data, call set-up data, average data rate data, or end-to-end delay data, and wherein the at least one RRM parameter comprises at least one of a hard network handover parameter, a soft cell handover parameter, a serving cell change parameter, or a rate switching parameter.

48. A network device, comprising:
means for providing at least one performance indicator standard to a mobile terminal, the at least one performance indicator standard comprising at least one of: a call drop standard, a call set-up standard, an average data rate standard, or an end-to-end delay standard; and
means for obtaining, from the mobile terminal, an adjustment request identifying at least one adjustment to a Radio Resource Management (RRM) parameter as determined by the mobile terminal based, at least in part, on wherein the at least one performance indicator standard, historical performance indicator data, at least one radio condition measurement, and wherein the historical performance indicator data comprises at least one of: call drop data, call set-up data, average data rate data, or end-to-end delay data, and wherein the at least one RRM parameter comprises at least one of a hard network handover parameter, a soft cell handover parameter, a serving cell change parameter, or a rate switching parameter.

* * * * *